July 7, 1970   A. A. PANTSIOS   3,519,706
METHOD OF FORMING HOT MELT ADHESIVE PELLETS
Filed June 25, 1968

INVENTOR.
ATHAN A. PANTSIOS
BY
Dunlap, Jauney & Hessin
ATTORNEYS

United States Patent Office 3,519,706
Patented July 7, 1970

---

3,519,706
METHOD OF FORMING HOT MELT
ADHESIVE PELLETS
Athan A. Pantsios, 7600 S. Merrill,
Chicago, Ill. 60600
Filed June 25, 1968, Ser. No. 739,822
Int. Cl. B02c 18/06
U.S. Cl. 264—143                                  5 Claims

ABSTRACT OF THE DISCLOSURE

A method of forming pellets of hot melt adhesive which includes the steps of continuously forming a plurality of elongated strips of molten hot melt adhesive, moving the strips longitudinally while concurrently forming the strips, cooling the strips during their longitudinal movement, twisting each of the strips about its longitudinal axis through an angle of about 180° during its longitudinal movement, and periodically severing the leading end portion of each of the strips during its longitudinal movement to form solid pellets.

BACKGROUND OF THE INVENTION

Field of the invention

This invention relates to methods of pelletizing materials, and more particularly, to a method of forming uniform flat pellets of a solidified thermoplastic material.

Brief description of the prior art

It has previously been proposed to manufacture small chips or pellets of various plastics in order that such materials may be more easily packaged and used. An example of a process for accomplishing such pelletizing is disclosed in Cooper et al. U.S. Pat. 2,975,483. In this process, a plurality of elongated, laterally spaced strands of molten thermoplastic are continuously extruded on the surface of a moving conveyor which continuously conveys these parallel strands to a pair of cooperating rollers which function to tension the strands and maintain them in parallelism. While on the conveyor, the strands are directly exposed to a cooling medium, such as a water spray, which causes the exterior portion of the strands to solidify, while permitting the core of each strand to remain molten. The cooperating rollers continuously feed the partially solidified strands to a cutting device which periodically severs the end portion of each strand to form a pellet.

In some generally similar, previously employed processes, the under side of the conveyor is cooled to cool an elongated sheet of molten material moving thereon.

BRIEF DESCRIPTION OF THE PRESENT INVENTION

Hot melt adhesives are thermoplastic bonding agents which achieve a solid state and resultant strength by cooling. It is recognized that these adhesives may often be utilized most successfully if they are in a rod, pellet or cordlike geometric configuration, since the material in this form melts rapidly, and there tends to occur less thermal degradation during use. The pellet form of the hot melt adhesive offers the further advantage of being easily stored, dispensed and handled.

It is important in making the adhesive pellets that the pellets be uniform in size and shape so uniformity is attained in application, and so that machines for handling and applying the adhesive can be simplified and can operate with fewer occurrences of malfunction.

The present invention is directed to the provision of a process which permits uniformly sized solid pellets of hot melt adhesive to be rapidly produced. Broadly described, the invention comprises positioning a quantity of molten hot melt adhesive in a supply container, exerting pressure on the surface of the body of molten hot melt adhesive to force the adhesive from the supply container to an extrusion head, extruding from the extrusion head a plurality of streams of molten adhesive, passing a cooled moving surface beneath said extrusion head for receiving the spaced streams of molten hot melt adhesive thereon, solidifying the strands of hot melt adhesive on the cooled moving surface, and tensioning the parallel strands of adhesive to maintain parallelism therebetween while the strands are on the cooled moving surface. Each strand of the adhesive has its leading end passed from the moving surface to a point spaced from the surface, and is twisted about its longitudinal axis through an angle of about 180° from the position it occupies on the moving surface. The leading end portions of the parallel strands of adhesive are then severed from the remainder of the strands to form uniformly sized pellets. The pellets may be collected and removed from the situs of the severing operation by any suitable means.

An important aspect of the process of the invention as broadly described in the preceding paragraph is that of twisting the parallel strands of adhesive about the longitudinal axis of each strand through an angle of about 180°. I have found that, in the absence of such twisting, the pellets formed by the severing operation are frequently non-uniform in size, with some of the pellets being undesirably larger than others. The twisting of the strands in the manner described, however, results in the realization of substantial uniformity in all of the produced pellets.

From the foregoing description of the invention, it will be perceived that the invention achieves a major objective of producing uniform pellets of hot melt adhesive by a rapid, mass production method which produces few reject pellets.

Another objective achieved by the invention is the provision of a reliable method for yielding pellets of hot melt adhesive in a form which is believed to be most suitable for packaging, and for a wide variety of adhesive applications and usages.

Other objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
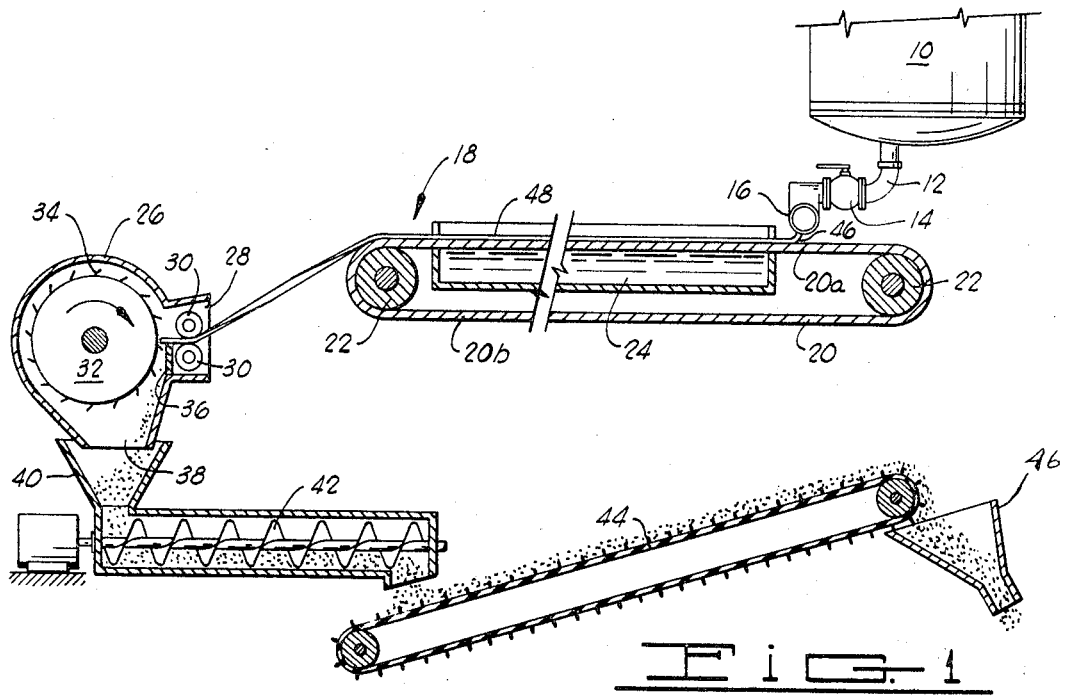
FIG. 1 is a side elevation, partially schematic view of apparatus which may be employed in carrying out the process of the invention.
Figure 2:
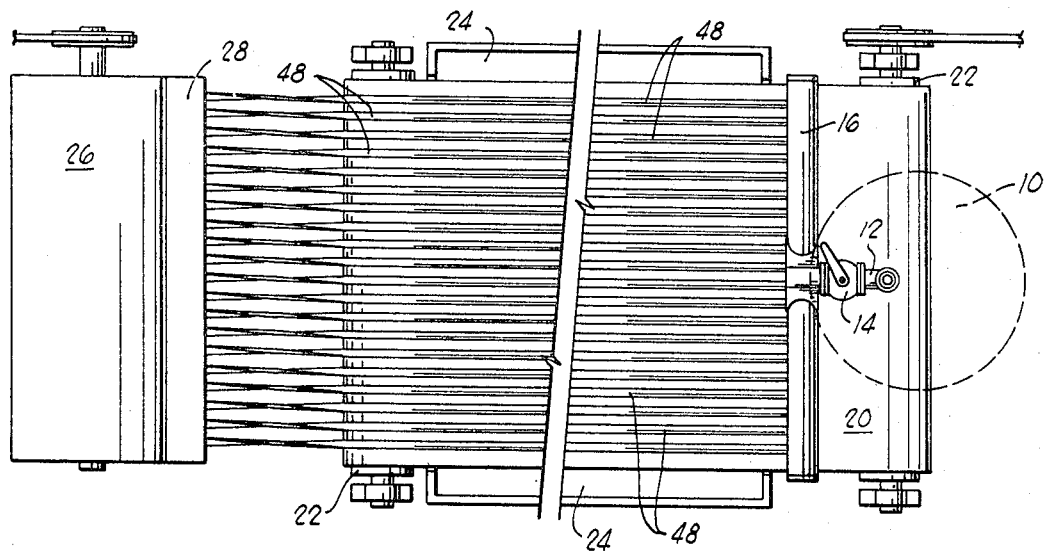
FIG. 2 is a plan view of the apparatus depicted in FIG. 1, and illustrating parallel strands of hot melt adhesive being produced in, and passed through, the apparatus.

Referring initially to FIG. 1 of the drawings, apparatus for carrying out the method of the invention is there depicted and includes a large hot melt adhesive reservoir or drum 10 in which a supply of molten hot melt adhesive is located. Connected to the center of the bottom side of the reservoir 10 is a feed conduit 12 which contains a control valve 14 and which is secured to the center of an elongated, cylindrical extrusion head 16. The elongated, cylindrical extrusion head 16 has formed in the lower side thereof, a plurality of horizontally aligned, axially spaced orifices from which molten hot melt adhesive may be extruded in a downward direction. The molten hot melt adhesive contained in the reservoir 10 can be fed to the elongated, cylindrical extrusion head 16 in any suitable manner, such as by gravity, pumping, or the like, but is preferably forced through the orifices in the lower side of the extrusion head by establishing a superatmospheric pressure in the reservoir 10 over the surface of the body of molten adhesive.

Spaced downwardly from about ½ inch to about 4 inches below the extrusion head 16 is an elongated conveyor assembly 18 which includes an endless belt 20 which is preferably made of steel, and which is passed over a pair of horizontally spaced rollers 22 so as to provide an upper run 20a and a lower run 20b. One or both of the rollers 22 may be powered by any suitable driving means so that the endless belt 20 moves continuously past the extrusion head. Disposed immediately beneath the upper run 20a of the endless belt 20 is a suitable water vat 24 which is continuously supplied with cool water which bathes the lower side of the upper run 20a of the endless belt 20.

Horizontally spaced from the end of the conveyor assembly 18 opposite the end near which the extrusion head 16 is located is a housing 26 which has a horizontally extending slot or opening 28 in one side thereof facing the conveyor assembly 18 and disposed slightly lower than the horizontal level of the upper run 20a of the conveyor 20. Located within the housing 26 are a pair of positively driven nip rolls 30 and a cutter drum 32. The rotational axes of the nip rolls 30 and the cutter drum 32 are, in each case, horizontal and extend parallel to each other. At the outer periphery of the cutter drum 32, this drum carries a plurality of elongated, horizontally extending knives 34, and the cutter drum 32 is positioned so that these knives are passed relatively close to the nip rolls 30 during the rotation of the cutter drum, and also extend immediately adjacent a strand supporting partition 36.

At its lower side, the housing 26 has a discharge opening 38 formed therein, and positioned below this discharge opening is a hopper 40 which conveys pellets of solidified hot melt adhesive to an auger conveyor 42 located immediately below the hopper. The auger conveyor 42 discharges the pellets onto an endless belt conveyor 44 which ultimately deposits the pellets in an open spout 46 leading to a suitable storage facility (not shown).

In the process of the invention, the drum 10 is partially filled with molten hot melt adhesive and a pressure is imposed on the body of adhesive to force it into the conduit 12 through the control valve 14, and into the extrusion head 16. From the extrusion head 16, the adhesive is extruded in a plurality of streams 46 (see FIG. 1). Due to the location of the orifices in the extrusion head 16, the plurality of gravitating streams 46 of the molten adhesive are in horizontal alignment, and extend transversely with respect to the upper run 20a of the endless belt 20 of the conveyor assembly 18. The streams 46 are thus laid out on the moving belt 20 as parallel strands 48, and are carried forward on the conveyor belt. The central span of the upper run 20a of the endless belt 20 is in contact with the surface of the cooled water in the vat 24 and is thus cooled. The molten strands 48 thus give up their heat of fusion to the upper run 20a of the endless belt 20, which in turn transfers the heat to the water located in the vat 24. The strands 48 thus solidify as they pass toward the forward end of the conveyor assembly 18.

Figure 3:
FIG. 3 is a perspective view of a pellet produced by the process of the invention.

After moving off of the forward end of the conveyor assembly 18, each of the strands 48 is twisted through an angle of 180°, and is passed between the pair of nip rolls 30 located in the housing 26. The twisting of the strands of the adhesive is an important aspect of the present invention and may be accomplished manually or automatically. In the illustrated embodiment of apparatus used in practicing the process of the invention, the twisting of the strands 48 is accomplished manually prior to their being fed to the nip rolls 30. Once the twist is placed in the strands, however, they will continue to feed to the nip rolls through the twist initially placed therein. It has been found that the twisting of the strands 48 in the manner described is important to the repeated attainment of uniformity in the adhesive pellets which are produced by the process of the invention. One of these pellets 50 is illustrated in near actual size in FIG. 3. When the strands 48 are not twisted in the manner described, there will occasionally be produced oversized pellets which are undesirable in adhesive applications where a precise quantity of the adhesive is required in order to obtain a neatly bonded joint or the like. It is thus important to make each of the pellets produced in the process be as nearly like each other pellet as possible.

It should be pointed out that the nip rolls 30 are rotated at a velocity such that a slight tension is exerted upon the several strands 48 as they are moved on the upper run 20a of the endless belt 20 of the conveyor assembly 18. This assures that the strands will not depart from parallelism and contact each other with the possibility of adhering to each other, and thus requiring the assembly to be temporarily shut down while separation of adhered strands is accomplished.

After feeding through the nip rolls 30, the strands of adhesive are passed over a supporting partition 36 located within the housing 24, and are immediately severed by one of the knives 34 carried on the periphery of the cutter drum 32. The knives 34 cut the end portion of each of the strands so as to produce relatively small, uniform pellets. The pellets then gravitate downwardly in the housing 26 and pass through the discharge opening 38 into the hopper 40. From the hopper 40, the pellets can conveniently be moved by an auger conveyor 42 to an endless belt conveyor 44 which then moves them into the open spout 46 leading to any suitable storage facility.

From the foregoing description of the invention, it will be perceived that by the present invention, the process of making pellets from continuous strands of material has been improved with respect to the uniformity which can be achieved when such pellets are derived from materials having the typical characteristics of holt melt adhesive. It is believed that the invention is the first recognition of the importance of twisting each of the parallel strands of the hot melt adhesive about its longitudinal axis.

Although a preferred embodiment of the process of the invention has been herein described in order to provide an example to those skilled in the art which will enable them to practice the invention, it will be appreciated that minor changes and innovations in the described process can be effected without departure from the basic principles of the invention. Changes of this type are therefore deemed to be circumscribed by the spirit and scope of the invention except as the same may be necessarily limited by the appended claims or reasonable equivalents thereof.

What is claimed is:

1. A method of producing uniformly sized pellets from molten thermoplastic adhesive material, comprising:
    (a) continuously depositing a plurality of substantially parallel streams of said molten adhesive upon a cooled substantially horizontal moving surface,
    (b) retaining said streams in a parallel relationship on said cooled moving surface to cool and solidify said streams into strands capable of maintaining their shape as said streams are moved with said moving surface,
    (c) applying a slight tension to said strands upon said moving surface to maintain parallelism of said strands,
    (d) removing said tensioned and cooled strands from said moving surface, (e) twisting each of said strands about its longitudinal axis through an angle of about 180 degrees and (f) subjecting each twisted strand to periodic severing to form relatively small pellets having a uniform size.

2. A method of producing pellets as defined in claim 1 wherein said strands are formed on said moving cooled surface by extruding molten adhesive through a plurality of horizontally spaced orifices positioned over said moving cooled surface so that extruded streams of molten adhesive gravitate onto said surface.

3. A method of producing pellets as defined in claim 2 wherein said moving, cooled surface is cooled by contacting with water the side thereof which is opposite the side supporting said strands.

4. A method of producing pellets as defined in claim 2 wherein the twisting of each of said strands through an angle of about 180° is accomplished between the location at which severance of each strand is accomplished, and the point where each strand leaves said moving cooled surface.

5. A method of producing pellets as defined in claim 4 wherein said strands are severed at a location where they are relieved of tension.

References Cited

UNITED STATES PATENTS

| | | | |
|---|---|---|---|
| 2,975,483 | 3/1961 | Cooper et al. | 264—143 |
| 3,208,101 | 9/1965 | Kaiser et al. | 264—13 |
| 3,441,637 | 4/1969 | Davis | 264—151 |

FOREIGN PATENTS 450,238   8/1948   Canada.

ROBERT F. WHITE, Primary Examiner

J. R. HALL, Assistant Examiner

U.S. Cl. X.R.

83—913